Feb. 17, 1948.  R. A. SHETKA  2,436,232
FISH LURE
Filed Dec. 1, 1945
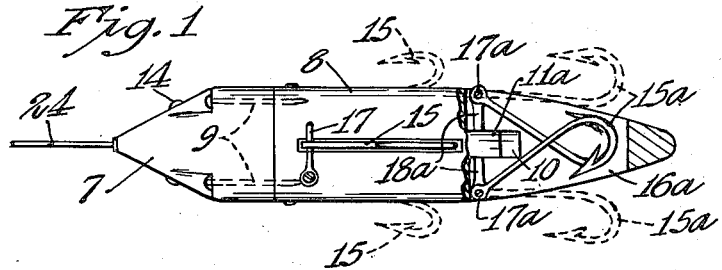
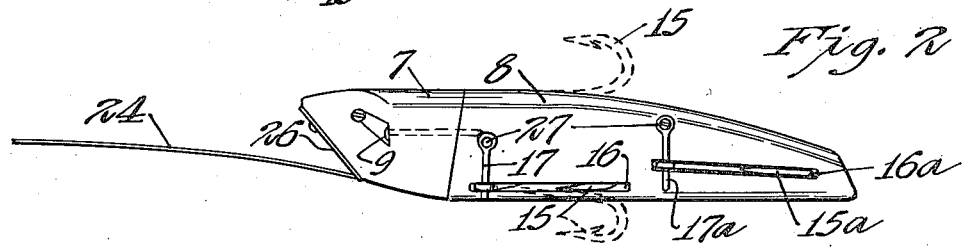
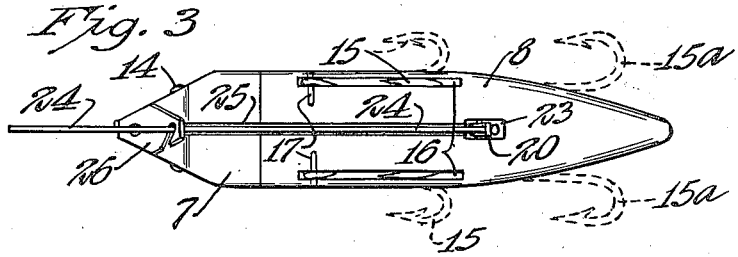
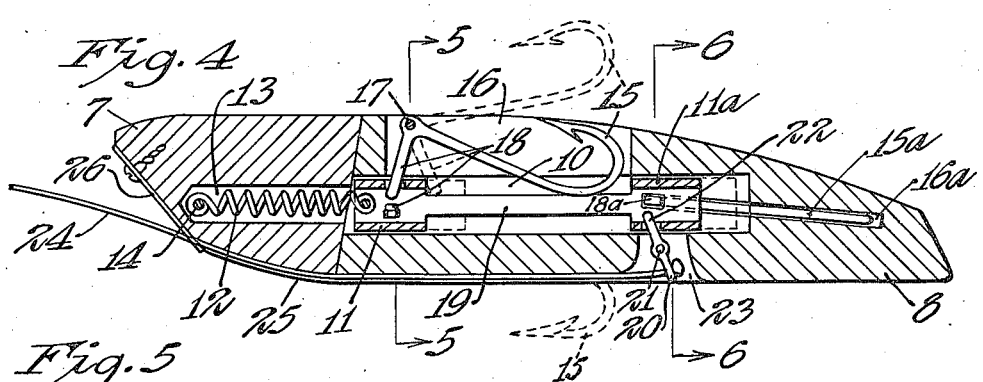
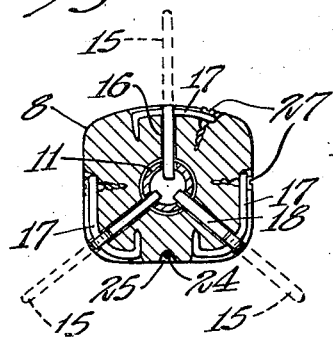
INVENTOR
ROBERT A. SHETKA, WARD
By ADOLPH SHETKA, GARDIAN
By John E. Snyder Jr.
Attorney Patented Feb. 17, 1948

2,436,232

UNITED STATES PATENT OFFICE 2,436,232

FISH LURE

Robert A. Shetka, ward, St. Paul, Minn., by Adolph Shetka, guardian, St. Paul, Minn.

Application December 1, 1945, Serial No. 632,160

2 Claims. (Cl. 43—35)

This invention relates to fish lures and particularly to a plug type lure carrying hooks which are normally retracted within the body of the device where they are substantially invisible and guarded against catching on weeds or other obstructions and having mechanism which causes the hooks to project instantaneously when the body is retarded relative to the line as when struck by a fish.

It is an object of the invention to provide in a lure of this class novel and efficient mechanism for actuating the hooks to and from retracted position.

The invention also includes certain novel features of construction which render the device strong, durable and easy to assemble.

Referring to the accompanying drawing which illustrates, by way of example and not for the purpose of limitation, a preferred form of the invention:

Figure 1 is a part top plan view and part horizontal section through the body of the lure;

Fig. 2 is a side elevational view of the same;

Fig. 3 is a bottom plan view of the same;

Fig. 4 is a vertical longitudinal section through the device on a somewhat larger scale, and Figs. 5 and 6 are cross sections taken respectively on the lines 5—5 and 6—6 of Fig. 4.

In the drawing the numeral 7 indicates the head of the lure which is attached to an elongated body 8 by means of small screws 9. The head and body are constructed from wood or other suitable material such as a moldable composition, preferably having specific gravity less than 1. Extending longitudinally and centrally within the body 8 is a cylindrical bore 10 in which is mounted a tubular member 11 connected to a small coiled spring 12. This spring is contained within a recess 13 formed in the head 7 and is anchored at its front end by means of a small pin 14.

A series of hooks 15 are movable within and extensible from radially extending slots 16 formed in the body 8. These slots communicate with the central bore 10 and each of the hooks 15 is pivotally mounted on a pin 17 extending in a cross groove in the exterior surface of the body, as indicated in Fig. 5. Integral with each hook 15 is a lever arm 18 which extends from the pivot pin radially inward to engage the tubular member 11 in an aperture formed therein. A second tubular member 11a is provided to the rear of the member 11 to actuate a pair of hooks 15a. These hooks are pivoted on pins 17a respectively and arranged to be retracted within slots 16a in the body 8. Integral lever arms 18a project from the hooks 15a into apertures formed in the member 11a to permit these hooks to be actuated, as in the case of the hooks 15, to and from retracted position relative to the body 8. The member 11 is connected to the member 11a by parallel strips 19 of the material forming these members.

The mechanism for actuating the hooks 15 and 15a further comprises a small lever 20, pivoted on a pin 21 and provided with an inner end portion 22 engaging the member 11a in an aperture formed therein. This lever 20 is confined within a radially extending slot 23 in the body 8. Connected to the outer end of the lever 20 is a flexible leader 24 arranged to extend forward within a guide slot 25 in the body 8 and head 7 and through an opening in a plate 26 mounted on the head 7. The forward end of this leader is adapted to be connected in the usual or suitable manner to a fish lure.

The spring 12 is preferably designed so that it will be extended to allow the hooks to project when the body of the lure is retarded under light gripping pressure. Quick movement of the sharp ends of the hooks is insured by the arrangement of the relatively short arms 18 and 18a connecting the several hooks to the actuating members 11 and 11a. Assembly and repair of the mechanism is facilitated by providing the removable head 7 allowing access to the bore 10 and members 11, 11a and 19 therein. After assembling these parts within the body 8 the several hook arms 18 and 18a are inserted in the apertures to receive them in the members 11 and 11a and then the pivot pins 17 and 17a are inserted and anchored in place as by the use of small screws 27 (Figs. 5 and 6).

When in use, the improved lure is drawn through the water in the usual manner as in trolling or casting with a line connected to a leader 24. The several hooks 15 and 15a are normally held in their completely retracted positions within the slots 16 and 16a by the coiled spring 12 acting through the members 11 and 11a, strips 19 and arms 18 and 18a of the hooks. The members 11 and 11a are thus retained in their forward positions shown in full lines in the drawing until the lure is retarded relative to the leader 24 with sufficient force to extend the spring 12. Since the hooks do not project from the exterior surfaces of the body 8 when in these retracted positions they cannot pick up weeds or snag obstructions with which the lure may come in contact. When a fish strikes or grasps the body of the lure, the retarding effect on the body relative to the leader 24 causes the latter to actuate the lever 20 and move the member 11a, strips 19 and member 11 to the rear in the bore 19. This oscillates all of the hooks instantaneously to positions where their sharp points project from the sides of the body, as indicated in dotted lines in the drawing, or to some other extended position where they become effective to perform their function of catching the fish striking the lure.

It has been found that the device operates efficiently in the catching of fish and that it minimizes danger of injury to persons handling the lure. It further guards against dulling of the hooks and obviates much of the annoyance usually attendant upon accidental catching of the hooks on snags and weeds when used in shallow water.

Having described the invention, what is claimed as new and desired to protect by Letters Patent is:

1. In a fish lure, a hollow elongated body having narrow longitudinally extending slots opening to the exterior thereof, a hook pivotally mounted in each of said slots and movable from a retracted position within the same to an extended position relative to the exterior surface of said body, an actuating member for said hooks movable longitudinally within said body, means operatively connecting the several hooks to said actuating member, a spring normally retaining said actuating member in a forward position within said body and the hooks in retracted positions in said slots, a lever pivotally supported in said body and having an inner end portion operatively connected to said actuating member and a leader connected to an outer end portion of said lever for actuating said member to a rear position, whereby said hooks may be caused to project from the body when the latter is retarded.

2. In a fish lure, an elongated body having a central longitudinally extending bore and narrow longitudinally extending slots opening to the exterior thereof and communicating with said bore, a hook pivotally mounted in each of said slots and movable from a retracted position within the same to an extended position relative to said body, a tubular actuating member for said hooks movable longitudinally within said bore, arms operatively connecting the several hooks to said actuating member, a spring normally retaining said actuating member in a forward position within said body and the hooks in retracted positions in said slots, a lever pivotally supported in a slot in said body and having an inner end portion operatively connected to said actuating member and a leader connected to an outer end portion of said lever for actuating said member to a rear position, whereby said hooks may be caused to project from the body when the latter is retarded.

ADOLPH SHETKA,
*Guardian of the Estate of Robert A. Shetka, Ward.*